Nov. 25, 1969 J. HAGER 3,479,859
METHOD AND APPARATUS FOR MEASURING THE BOILING POINT OF A LIQUID
Filed Feb. 6, 1967
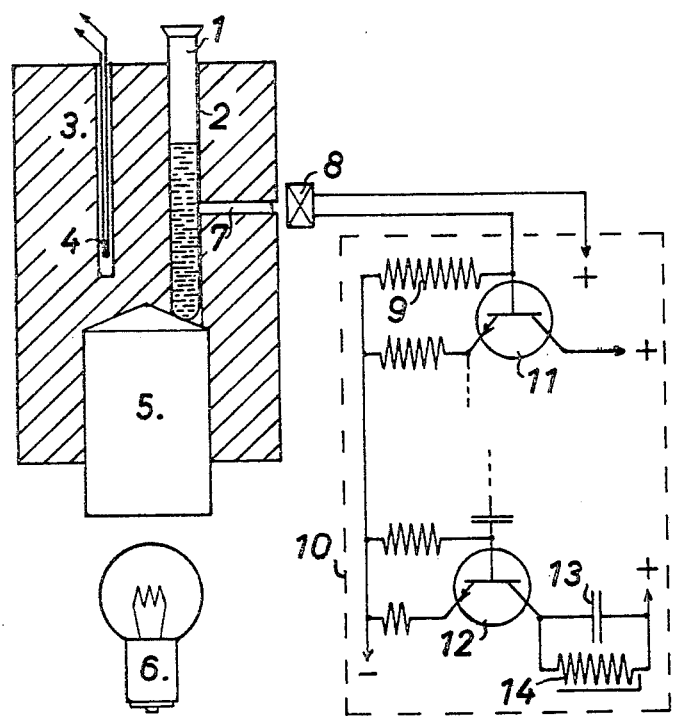
INVENTOR:
Jürg Hager
BY:
Lawrence E. Laubscher
ATTORNEY.

United States Patent Office 3,479,859
Patented Nov. 25, 1969

3,479,859
METHOD AND APPARATUS FOR MEASURING THE BOILING POINT OF A LIQUID
Jürg Hager, Rapperswil, Switzerland, assignor to Mettler Instrumente AG, Zurich, Switzerland, a Swiss corporation
Filed Feb. 6, 1967, Ser. No. 614,298
Claims priority, application Switzerland, July 29, 1966, 11,034/66
Int. Cl. G01n 25/02; H01j 39/12
U.S. Cl. 73—17         4 Claims

ABSTRACT OF THE DISCLOSURE

Method and apparatus for determining the boiling point of a liquid, characterized by the measurement of the light reflected by the bubbles in a direction perpendicular to that in which they are rising, whereby the measurement of the boiling temperature of a liquid can be largely automated. The light reflected by the bubbles is measured electrically, account being taken of the amount of time required for the ascending bubbles to cover a given measuring path, as well as the number of bubbles passing said measuring path per unit of time.

---

This invention relates to measuring the boiling point of liquids.

It is known to determine the boiling point of a liquid by slowly heating the liquid and observing the temperature at which intensive formation of rising vapour bubbles sets in. In order to see more clearly the appearance of the bubbles the liquid is usually illuminated in a vertical direction and observed horizontally. If no vapour bubbles are present a more or less dark background is seen. But if there is a vapour bubble in the liquid this will reflect light, part of which will pass along the direction of observation. When vapour bubbles appear a corresponding number of bright light spots of different sizes will be seen, moving upwards at different speeds.

Even when observation is facilitated in this way, any decision as to when the rising vapour bubbles are being formed sufficiently intensively to enable one to assume that the boiling point has been reached still depends on the judgment of the observer, and is therefore liable to subjective errors.

The present invention accordingly concerns a method and an apparatus for measuring the boiling point of a liquid, in which the liquid is illuminated and the vapour bubbles are observed, with the aid of the light reflected by them, in a direction perpendicular to that in which they are rising. The aim is to avoid the above mentioned subjective errors and to provide a method and an apparatus for measuring the boiling temperature of liquids which can be largely automated. This is achieved, according to the present invention, in that the vapour bubbles are made to travel along a measuring path of known length, that the light reflected by them within this measuring path is picked up by a photoelectric cell, and that an electrical measuring value is obtained by means of an electronic amplifier connected to said cell, the electrical measuring value corresponding to the amount of vapour being formed per unit of time in accordance with the vapour bubbles passing along said measuring path. It has been found desirable for the electrical measuring value to take in the amount of time required by the ascending bubbles to cover said measuring path. It is preferable, however, for the electrical measuring value also to include the number of bubbles passing said measuring path per unt of time.

The method according to the invention is further explained below by reference to the accompanying drawing in which is shown a simplified example of an apparatus for carrying out the method.

The liquid of which the boiling temperature has to be determined is placed in a test tube 1 of usual dimensions. An additional aid to boiling, such as a chip or a small capillary tube, may be provided in the test tube 1. This test tube is in turn placed in the nesting passage 2 provided in a metal oven body 3 which has a heating coil (not shown). Inserted within the oven body 3 is a temperature sensor 4, such as a thermo-couple or a temperature-dependent resistor, which may be used to measure the oven temperature. The oven body 3 also has a light conductor 5 of heat-proof glass, and the bottom of the test tube 1 rests against the conical surface thereof. A projecting end of the light conductor 5 is irradiated by a lamp 6 located outside the oven body 3, so that the liquid in the test tube 1 is illuminated in an upward direction.

The oven body 3 finally has an observation passage 7 of rectangular or square cross-section, extending transversely from the nesting passage 2. Through this observation passage which constitutes a well defined measuring path a strictly limited volume of liquid in the test tube 1 can be observed. Opposite the mouth of the observation passage 7 is a photoelectric cell 8, which may comprise a cadmium sulphide resistor. The cell 8 is connected in series with a resistor 9, to a source of DC voltage (not shown). The voltage fluctuations which occur at the resistor 9 as the illumination of the cell 8 varies are amplified with the aid of a transistor amplifier 10. Of this only the input transistor 11 is illustrated in the drawing; the transistor 11 operates in the common-collector circuit to produce a high input resistance. Coupled to the emitter resistor of transistor 11 the amplifier 10 may have a voltage amplifier of usual design, generally a multi-stage one, although for reasons of clarity this has not been shown. This voltage amplifier serves to drive an electrical integrator which in the drawing comprises an output transistor 12, a charging capacitor 13, and a discharging resistor 14. This resistor 14 may be replaced by a high-resistance energizing coil of an electro-mechanical relay which would then preferably have a self-holding contact to keep the relay energized once it has responded. The base of the output transistor 12 has no special bias, so that a collector current can flow only when the positive control voltage impressed on the base exceeds a certain threshold value. Otherwise the entire electronic amplifier 10 is designed to have a lower frequency limit of about 0.5 cycle per second and an upper frequency limit of about 500 cycles per second.

When the liquid in the test tube 1 is not boiling the photoelectric cell 8 will carry only a certain constant dark current. In this case the output transistor 12 will have no collector current and there will be zero voltage across the charging capacitor 13. Accordingly, the above-mentioned relay coil will also be de-energized.

If a vapour bubble rises a light pulse of short duration will impinge on the cell 8 during the passage of the bubble along the said measuring path, resulting in a corresponding voltage pulse at the base of the input transistor 11. For a given liquid the amplitude of this pulse is approximately proportional to the surface area of the vapour bubble in question. The duration of the pulse on the other hand is determined by the time taken by the bubble to cover the measuring path. This time in turn depends, amongst other things, on the volume of the bubble, and the geometrical dimensions of the test tube 1 will also have to be allowed for. With ordinary test tubes 1 of small cross-section the mean dimensions of the vapour bubbles can already be compared with the cross-sectional dimensions of the tube. In such cases larger bubbles have been found to rise more slowly than smaller ones. Under these circumstances the duration of the above-mentioned voltage pulse will increase approximately proportional to the size of the bubble. For a bubble of mean size the time taken to cover the measuring path or the duration of the pulse will be about one tenth of a second.

The voltage pulse triggered off by a vapour bubble reaches the base of the output transistor 12 suitably amplified. There is therefore a voltage rise at the charging capacitor 13 for the duration of the pulse, and the final voltage reached is substantially proportional to the product of the length and the amplitude of the pulse. Owing to the resistor 14 the voltage at the capacitor 13 will thereupon drop back to zero unless another vapour bubble has risen in the meantime and another voltage pulse has been applied at the base of transistor 12.

If the bubbles, and thus the voltage pulses, occur in a statistically irregular sequence the mean value of the voltage at the charging capacitor 13 will constitute an electrical measuring value corresponding to the amount of vapour being developed per unit of time and the same holds also for the electric current flowing through the discharging resistor 14. This electrical measuring value takes in both the volume of the individual bubbles and the number of bubbles per unit of time, and subjective errors are thus excluded. Accordingly, if the resistor 14 is replaced by the coil of an electromechanical relay as described above, the relay will respond when a predetermined voltage limit is reached at the capacitor 13, thus indicating that the boiling temperature of the liquid being tested has been reached. The relay may also be used to provide for the reading or storage of the boiling temperature, and to switch off the heating of the oven body 3. In this way the determination of the boiling points of liquids can be automated.

I claim:

1. A method of measuring the boiling temperature of a liquid, which comprises the steps of:
   heating the liquid to generate vapor bubbles therein;
   illuminating the bubbles in the direction of their ascendancy along a given measuring path of known length; and
   measuring the quantity of light reflected at right angles by the bubbles per unit time during their passage along said measuring path.

2. The method as defined in claim 1, wherein said measuring step includes measuring the reflected light as a function of the time required for the vapor bubbles to traverse said measured path.

3. The method as defined in claim 1, wherein said measuring steps includes measuring the number of vapor bubbles that traverse said path per unit of time.

4. Apparatus for measuring the boiling temperature of a liquid contained in a test tube, comprising:
   (A) oven means for heating the liquid in the test tube to generate vapor bubbles therein;
   (B) means for illuminating the liquid in the direction of ascendancy of the bubbles; and
   (C) electrical means for measuring the light reflected at right angles by said bubbles toward an observation passage contained in said oven means, including:
      (1) photoelectric cell means arranged adjacent the mouth of said passage for generating electric signals as a function of the light reflected thereon by said bubbles;
      (2) amplifier means for amplifying said electric signals;
      (3) integrator means connected with said amplifier means for establishing an electrical measuring value corresponding with the amount of vapor being formed per unit time inside the test tube in accordance with the vapor bubbles passing said observation passage; and
      (4) means for indicating when the electrical measuring value reaches a given rate.

References Cited

UNITED STATES PATENTS

| 2,436,145 | 2/1948 | Johnson | 250—215 X |
| 3,031,880 | 5/1962 | Findlay | 73—17 |
| 3,253,454 | 5/1966 | Neil. | |

JERRY W. MYRACLE, Primary Examiner

U.S. Cl. X.R.

137—93; 250—215